(12) United States Patent
Lin et al.

(10) Patent No.: US 12,253,777 B2
(45) Date of Patent: Mar. 18, 2025

(54) DISPLAY PANEL AND DISPLAY APPARATUS

(71) Applicants: Fuzhou BOE Optoelectronics Technology Co., Ltd., Fujian (CN); BOE Technology Group Co., Ltd., Beijing (CN)

(72) Inventors: Yabin Lin, Beijing (CN); Qiaoni Wang, Beijing (CN); Jianming Huang, Beijing (CN); Hailong Yu, Beijing (CN); Xuezhen Su, Beijing (CN); Wanping Pan, Beijing (CN); Xiaobo Jia, Beijing (CN)

(73) Assignees: Fuzhou BOE Optoelectronics Technology Co., Ltd., Fujian (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 18/028,312

(22) PCT Filed: Apr. 29, 2022

(86) PCT No.: PCT/CN2022/090501
§ 371 (c)(1),
(2) Date: Mar. 24, 2023

(87) PCT Pub. No.: WO2023/206442
PCT Pub. Date: Nov. 2, 2023

(65) Prior Publication Data
US 2024/0310684 A1 Sep. 19, 2024

(51) Int. Cl.
*G02F 1/1362* (2006.01)
*G02F 1/1335* (2006.01)

(52) U.S. Cl.
CPC .. *G02F 1/136286* (2013.01); *G02F 1/133512* (2013.01)

(58) Field of Classification Search
CPC ...................................... G02F 1/1362
See application file for complete search history.

(56) References Cited

U.S. PATENT DOCUMENTS

2010/0289994 A1* 11/2010 Nonaka .................... G09G 3/20
349/108
2013/0300965 A1* 11/2013 Nonaka ............. G02F 1/133514
349/42

(Continued)

FOREIGN PATENT DOCUMENTS

CN 105911744 * 6/2016 .......... G02F 1/1335
CN 105911744 A 8/2016
(Continued)

*Primary Examiner* — Sang V Nguyen
(74) *Attorney, Agent, or Firm* — IPro, PLLC

(57) ABSTRACT

A display panel and a display apparatus. The display panel includes: a display region and at least one non-display region adjacent to the display region, and a boundary between the at least one non-display region and the display region has a curve part; and the display panel includes: a plurality of pixels, distributed in a first direction and a second direction in an array; the plurality of pixels include: a plurality of first pixel groups adjacent to the curve part, each first pixel group is divided into a plurality of first sub-pixel groups distributed in the first direction, each first sub-pixel group includes at least one first sub-pixel, a width of the first sub-pixel in the first direction is smaller than a width of the first sub-pixel in the second direction.

17 Claims, 17 Drawing Sheets

(56) References Cited

U.S. PATENT DOCUMENTS

| | | | |
|---|---|---|---|
| 2018/0337217 A1 | 11/2018 | Zang et al. | |
| 2019/0140026 A1* | 5/2019 | Nakanishi | H10K 59/352 |
| 2020/0201390 A1* | 6/2020 | Lin | G06F 1/1609 |
| 2021/0367002 A1 | 11/2021 | Deng et al. | |
| 2023/0009464 A1 | 1/2023 | Xu et al. | |

FOREIGN PATENT DOCUMENTS

| | | | |
|---|---|---|---|
| CN | 107507522 A | 12/2017 | |
| CN | 108828851 A | 11/2018 | |
| CN | 105788470 B | 6/2019 | |
| CN | 109870846 A | 6/2019 | |
| CN | 111522170 A | 8/2020 | |
| CN | 109188762 B | 6/2021 | |
| JP | H09245181 A | 9/1997 | |
| WO | WO-2023159844 * | 6/2022 | H01L 27/32 |

* cited by examiner

DISPLAY PANEL AND DISPLAY APPARATUS

CROSS REFERENCE TO RELATED APPLICATIONS

The present disclosure is a national phase entry under 35 U.S.C § 371 of International Application No. PCT/CN2022/090501, filed Apr. 29, 2022, and entitled "DISPLAY PANEL AND DISPLAY APPARATUS".

FIELD

The present disclosure relates to the field of display, in particular to a display panel and a display apparatus.

BACKGROUND

With fast development of a display technology, shapes of display products in intelligent terminals are increasingly abundant, for example, a display product with a circular screen or an arc screen is quite popular. The display product with the arc screen or the circular screen is usually applied to a smart bracelet or a smartwatch and the like, a size of the display product is small, and with constantly increasing demands for a mid-large size circular screen or arc display in the market, a mid-large size display screen is more and more popular. However, visible aliasing feeling and color stripes are prone to occurring to an edge of a display region of the circular screen or the arc screen, and a display effect and user experience are affected.

SUMMARY

Embodiments of the present disclosure provide a display panel. The display panel includes: a display region and at least one non-display region adjacent to the display region, and a boundary between the at least one non-display region and the display region has a curve part; and
  the display panel includes: a plurality of pixels, distributed in a first direction and a second direction in an array;
  the first direction intersects with the second direction, the plurality of pixels include: a plurality of first pixel groups adjacent to the curve part, each first pixel group is divided into a plurality of first sub-pixel groups distributed in the first direction, each first sub-pixel group includes at least one first sub-pixel, a width of the first sub-pixel in the first direction is smaller than a width of the first sub-pixel in the second direction;
  a shape of the first pixel group and a shape of the first sub-pixel group are each a non-rectangle with the number of sides being greater than 3, the first pixel group includes a first bottom side and a second bottom side parallel to the first direction and opposite to each other, a length of the first bottom side is smaller than a length of the second bottom side, and areas of the plurality of first sub-pixel groups included in the first pixel group are approximately equal.

In some embodiments, an area of the first pixel group is equal to a sum of the areas of the plurality of first sub-pixel groups included in the first pixel group, and the plurality of first sub-pixel groups included in the first pixel group are distributed continuously in sequence in the first direction; and
  the first bottom side and the second bottom side are divided in average by the plurality of first sub-pixel groups included in the first pixel group, a boundary between any two adjacent first sub-pixel groups is a first oblique side, and the first oblique side is not perpendicular to both the first bottom side and the second bottom side.

In some embodiments, shapes of at least part of first pixel groups are quadrilaterals, the shapes of the plurality of first sub-pixel groups included in the first pixel group are quadrilaterals; and
  the first pixel group further includes a first right-angle side perpendicular to both the first bottom side and the second bottom side, and a second oblique side not perpendicular to both the first bottom side and the second bottom side, and the second oblique side is adjacent to the curve part.

In some embodiments, the first oblique side, the first bottom side, the second bottom side and the second oblique side are all straight-line segments, and the shape of the first pixel group and the shapes of the plurality of first sub-pixel groups included in the first pixel group are all trapezoids; and
  the areas of the plurality of first sub-pixel groups included in the first pixel group are all equal.

In some embodiments, the first oblique side, the first bottom side and the second bottom side are all straight-line segments, and the second oblique side is an arc segment; and
  in the first pixel group, a shape of the first sub-pixel group closest to the curve part is an approximate trapezoid with a second oblique side being an arc segment, and shapes of the first sub-pixel groups except that being closest to the curve part are all trapezoids.

In some embodiments, shapes of at least part of first pixel groups are pentagons:
  the first pixel group further includes: a first right-angle side perpendicular to both the first bottom side and the second bottom side, a third oblique side connected with the first bottom side and a fourth oblique side connected with the third oblique side and the second bottom side, and the third oblique side and the fourth oblique side are adjacent to the curve part; and
  in the first pixel group, a shape of the first sub-pixel group closest to the curve part is a pentagon, and shapes of the first sub-pixel groups except that being closest to the curve part are all trapezoids.

In some embodiments, the third oblique side and/or the fourth oblique side is a straight-line segment.

In some embodiments, the fourth oblique side is perpendicular to the second bottom side.

In some embodiments, the third oblique side and the fourth oblique side are both arc segments.

In some embodiments, the quantity of the first sub-pixel groups included in each first pixel group is equal.

In some embodiments, a shape of an aperture region of each first sub-pixel is similar to a shape of the first sub-pixel.

In some embodiments, a plurality of first sub-pixels distributed in the first direction constitute a first pixel, and at least part of first pixel groups include only one first pixel.

In some embodiments, a plurality of first sub-pixels distributed in the first direction constitute one first pixel, and at least part of first pixel groups include a plurality of first pixels distributed in the second direction.

In some embodiments, the curve part includes a plurality of circular arc parts, and a radian of each circular arc part is smaller than or equal to 90°.

In some embodiments, the plurality of pixels further include a plurality of second pixels, and shapes of the second pixels are rectangles:

second pixels include a plurality of second sub-pixels distributed in the first direction: the quantity of the second sub-pixels included in the second pixels is the same as the quantity of the first sub-pixels included in the first pixels;

the plurality of pixels are divided into a plurality of pixel rows extending in the first direction and distributed in the second direction;

each circular arc part corresponds to n pixel rows, and each pixel row at least includes a plurality of second pixels, wherein n is an integer greater than 1: an $i^{th}$ pixel row in the n pixel rows has a first semifocal chord Li1 and a second semifocal chord Li2 on a circumference corresponding to the circular arc part, wherein Li2>Li1, 1≤i≤n; and the first pixel groups are arranged in a region meeting (Li2-Li1)< (m−1) a/m, where a is a width of the second pixel in the first direction, and m is the quantity of second sub-pixels included in the second pixels.

In some embodiments, when a/m≤di<a, the $i^{th}$ pixel row further includes first pixels, wherein di is a minimum width between a second pixel closest to the circular arc part in the $i^{th}$ pixel row and the circular arc part.

In some embodiments, when di<a, the second pixels in the $i^{th}$ pixel row are adjacent to the circular arc part.

In some embodiments, when a/m≤Di<a, the first bottom side and the second bottom side intersect with the circular arc part, where Di is a maximum width between a second pixel closest to the circular arc part in the $i^{th}$ pixel row and the circular arc part.

In some embodiments, when a≤Di, a distance between the second bottom side and the circular arc part is greater than zero, where Di is a maximum width between a second pixel closest to the circular arc part in the $i^{th}$ pixel row and the circular arc part.

In some embodiments, a shape of the display region is a circle: the at least one non-display region includes: a first non-display region surrounding the display region; and the plurality of circular arc parts included in the curve part are a circumference corresponding to a boundary between the first non-display region and the display region.

In some embodiments, the at least one non-display region includes: a first non-display region surrounding the display region; and a shape of the display region is a rounded rectangle, and the plurality of circular arc parts are four rounded corner parts of a boundary between the display region and the first non-display region.

In some embodiments, the at least one non-display region includes: a second non-display region surrounded by the display region; and a shape of the second non-display region is a circle, and the curve part includes a circumference corresponding to a boundary between the second non-display region and the display region.

In some embodiments, the display panel includes:

an array substrate, including: a first base substrate and a plurality of data lines located on a side of the first base substrate and distributed in the first direction: the plurality of data lines include a plurality of first data lines, and each first data line includes a first bent part corresponding to the first oblique side and a straight-line part connected with the first bent part;

an opposite substrate, opposite to the array substrate and including: a second base substrate and a light shield layer arranged on a side of the second base substrate facing the array substrate: the light shield layer includes: a first light shield part, a second light shield part and a plurality of sub-pixel aperture regions, an orthographic projection of a region surrounded by the first light shield part on the second base substrate coincides with the display region, the second light shield part is arranged between adjacent sub-pixel aperture regions, and the plurality of sub-pixel aperture regions include first aperture regions similar to the first sub-pixels in shape; and a liquid crystal layer, arranged between the array substrate and the opposite substrate.

In some embodiments, the plurality of pixels include the second pixels, and the light shield layer further includes a third light shield part located between the second pixels and an arc part.

In some embodiments, the light shield layer further includes a fourth light shield part arranged between the first pixels and the arc part.

The embodiments of the present disclosure provide a display apparatus, including the display panel provided by the embodiment of the present disclosure.

BRIEF DESCRIPTION OF THE DRAWINGS

In order to describe the technical solutions in the embodiments of the present disclosure more clearly, the accompanying drawings needed in the description of the embodiments will be introduced briefly below: Apparently, the accompanying drawings in the following description are only some embodiments of the present disclosure. Those ordinarily skilled in the art may also obtain other accompanying drawings according to these accompanying drawings without creative work.

DETAILED DESCRIPTION OF THE EMBODIMENTS

Figure 1:
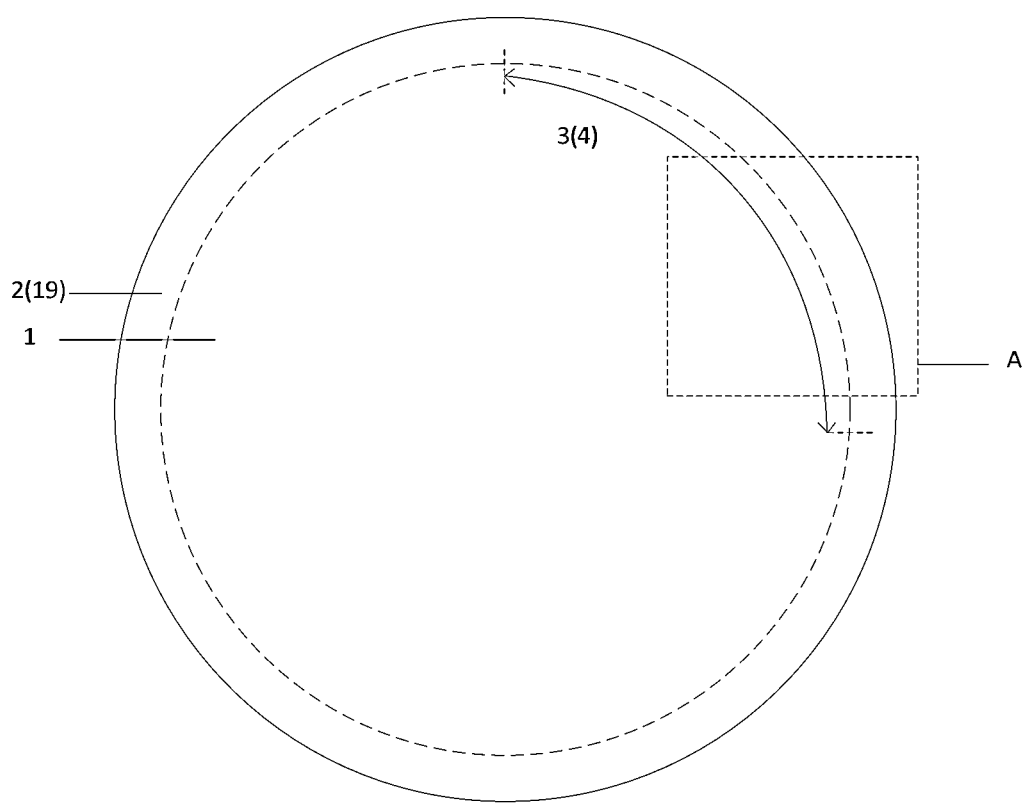
FIG. 1 is a schematic structural diagram of a display panel provided by an embodiment of the present disclosure.

In order to make objectives, technical solutions and advantages of the embodiments of the present disclosure clearer, the technical solutions of the embodiments of the present disclosure will be described clearly and completely below with reference to the accompanying drawings of the embodiments of the present disclosure. Apparently, the described embodiments are some embodiments but not all embodiments of the present disclosure. The embodiments in the present disclosure and features in the embodiments may be mutually combined without conflicts. Based on the described embodiments of the present disclosure, all other embodiments obtained by those ordinarily skilled in the art without creative work fall within the protection scope of the present disclosure.

Unless otherwise defined, technical or scientific terms used in the present disclosure should be understood commonly by those ordinarily skilled in the art to which the present disclosure pertains. "First", "second" and similar words used in the present disclosure do not represent any sequence, quantity or significance but are only used for distinguishing different components. "Include" or "contain" and similar words mean that an element or an item preceding the word covers elements or items listed after the word and their equivalents without excluding other elements or items. "Connection" or "connected" and similar words may include an electrical connection, direct or indirect, instead of being limited to a physical or mechanical connection.

It needs to be noted that sizes and shapes of all figures in the accompanying drawings do not reflect a true scale and are only intended to illustrate contents of the present disclosure. The same or similar reference numerals represent the same or similar elements or elements with the same or similar function all the time.

In the related art, an arc screen or circular screen display product usually adopts a circular arc black matrix to block pixels at an edge of a display region, areas of different sub-pixels in the pixels blocked by the circular arc black matrix are greatly different, and thus aperture areas of the different sub-pixels in the pixels are greatly different. When a pixel includes a red sub-pixel, a blue sub-pixel and a green sub-pixel, for example, there may be a region where a large part of blue sub-pixels are blocked, which leads to aperture areas of the red sub-pixels and the green sub-pixels being greater than an aperture area of the blue sub-pixels, and local yellow is presented in the region. When most of blue sub-pixels and green sub-pixels are blocked in a region, the aperture area of the red sub-pixels is large, partial region presents red, and so on, and a phenomenon of Newton's rings is prone to occurring in a circular arc region. However, if no pixel is arranged in a position of the circular arc region where whole red, green and blue sub-pixels cannot be placed, and the position is blocked directly by using a black matrix, an obvious phenomenon of edge aliasing may occur, and a display effect is affected.

Based on the above problem in the related art, embodiments of the present disclosure provide a display panel, as shown in FIG. 1, including: a display region 1 and at least one non-display region 2 adjacent to the display region 1. A boundary between the at least one non-display region 2 and the display region 1 has a curve part 3.

Figure 2:
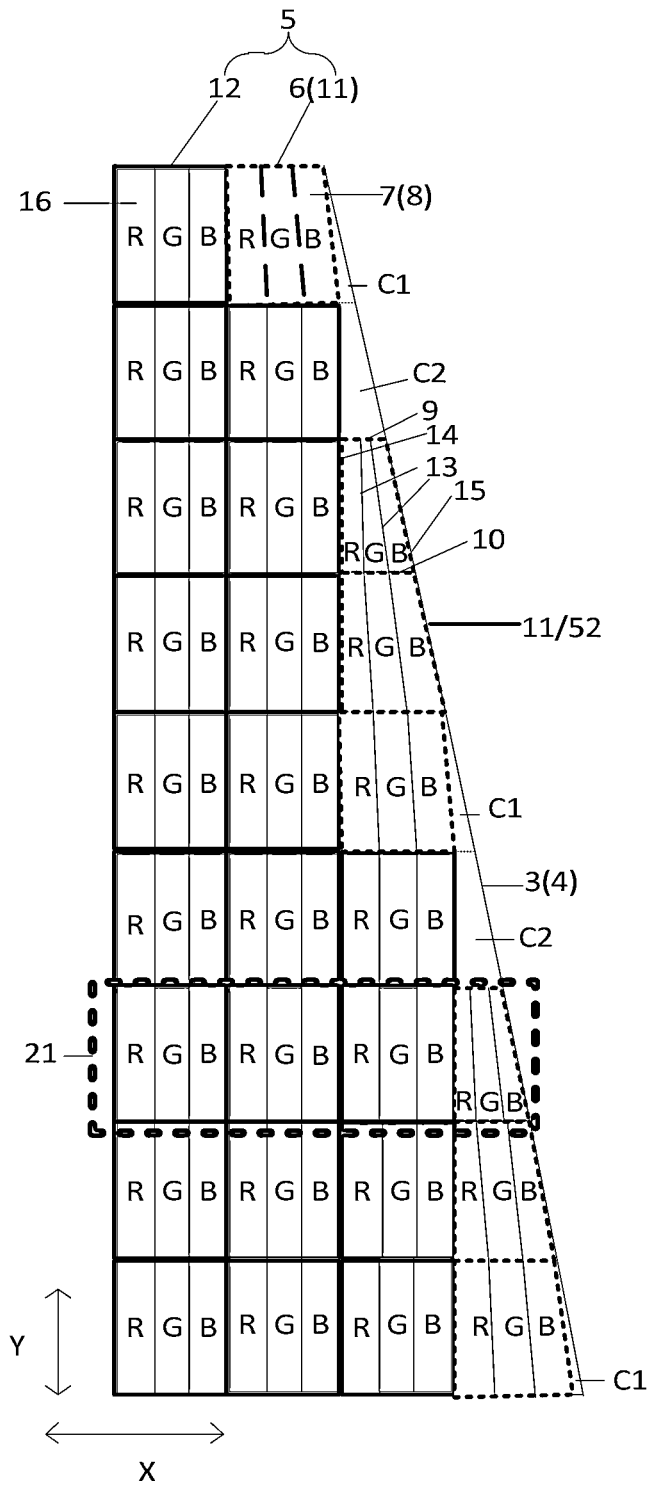
FIG. 2 is a schematic structural of an enlarged view of a region A in FIG. 1 provided by an embodiment of the present disclosure.

As shown in FIG. 2, the display panel includes: a plurality of pixels 5, distributed in a first direction X and a second direction Y in an array, the first direction X intersects with the second direction Y: each pixel includes a plurality of sub-pixels, the plurality of pixels 5 include: a plurality of first pixel groups 6 adjacent to the curve part 3, each first pixel group 6 is divided into a plurality of first sub-pixel groups 7 distributed in the first direction X, each first sub-pixel group 7 includes at least one first sub-pixel 8, a width of the first sub-pixel 8 in the first direction X is smaller than a width of the first sub-pixel 8 in the second direction Y, a shape of the first pixel group 6 and a shape of the first sub-pixel group 7 are each a non-rectangle with the number of sides being greater than 3, the first pixel group 6 includes a first bottom side 9 and a second bottom side 10 parallel to the first direction X and opposite to each other, a length of the first bottom side 9 is smaller than a length of the second bottom side 10, and areas of the plurality of first sub-pixel groups 7 included in the first pixel group 6 are approximately equal.

According to the display panel provided by the embodiments of the present disclosure, the shape of the first pixel group adjacent to the curve part is a non-rectangle with the number of sides being greater than 3, so that the shape of the first pixel group may match a shape of the display region nearby the curve part, a region nearby the curve part may be prevented from having edge aliasing, moreover, the first pixel group may be prevented from being blocked by a non-display region, that is, the first sub-pixels in the first pixel groups are prevented from being blocked by the non-display region, and integrity of the first sub-pixels in the first pixel group is ensured. Correspondingly: when the areas of the plurality of first sub-pixel groups included in the first pixel group are approximately equal. Newton's rings may be prevented from occurring in the region nearby the curve part, the display effect may be improved, and user experience is improved.

It needs to be noted that FIG. 2 is an enlarged view of a region A in FIG. 1. In FIG. 2, the first direction X is perpendicular to the second direction Y, illustration is made by taking the first direction X being a row direction and the second direction Y being a column direction as an example in FIG. 2, and certainly, during specific implementation, the first direction X and the second direction Y may be interchangeable.

It needs to be noted that the areas of the plurality of first sub-pixel groups included in the first pixel group being approximately equal means that the areas of the plurality of first sub-pixel groups included in the first pixel group may be equal: or the areas of the plurality of first sub-pixel groups included in the first pixel group are not completely equal, but a difference of the areas of the different first sub-pixel groups is smaller than a first preset value. It needs to be noted that the first preset value may be set according to actual demands as long as the difference among the areas of the different first sub-pixel groups does not cause the Newton's rings nearby the curve part.

In some embodiments, a shape of an aperture region of the first sub-pixel is similar to a shape of the first sub-pixel. In other words, the shape of the aperture region of the first sub-pixel is a non-rectangle with the number of sides being greater than 3.

In some embodiments, the areas of the aperture regions of the plurality of first sub-pixels included in the first pixel group are approximately equal.

According to the display panel provided by the embodiments of the present disclosure, the areas of the plurality of first sub-pixel groups included in the first pixel group are approximately equal, the shape of the aperture region of each first sub-pixel is similar to the shape of the first sub-pixel, the areas of the aperture regions of the plurality of first sub-pixels included in the first pixel group are approximately equal, the Newton's rings may be prevented from occurring in the region nearby the curve part, the display effect may be improved, and the user experience is improved.

It needs to be noted that the areas of the aperture regions of the plurality of first sub-pixels included in the first pixel group being approximately equal means that the areas of the aperture regions of the plurality of first sub-pixels included in the first pixel group may be equal: or the areas of the aperture regions of the plurality of first sub-pixels included in the first pixel group are not completely equal, but a difference of the areas of the aperture regions of the different first sub-pixels is smaller than a second present value. It needs to be noted that the second present value may be set according to actual demands, so that the difference among the areas of the aperture regions of the different first sub-pixels does not cause Newton's rings nearby the curve part.

In some embodiments, the first pixel groups are completely located in the display region.

Figure 3:
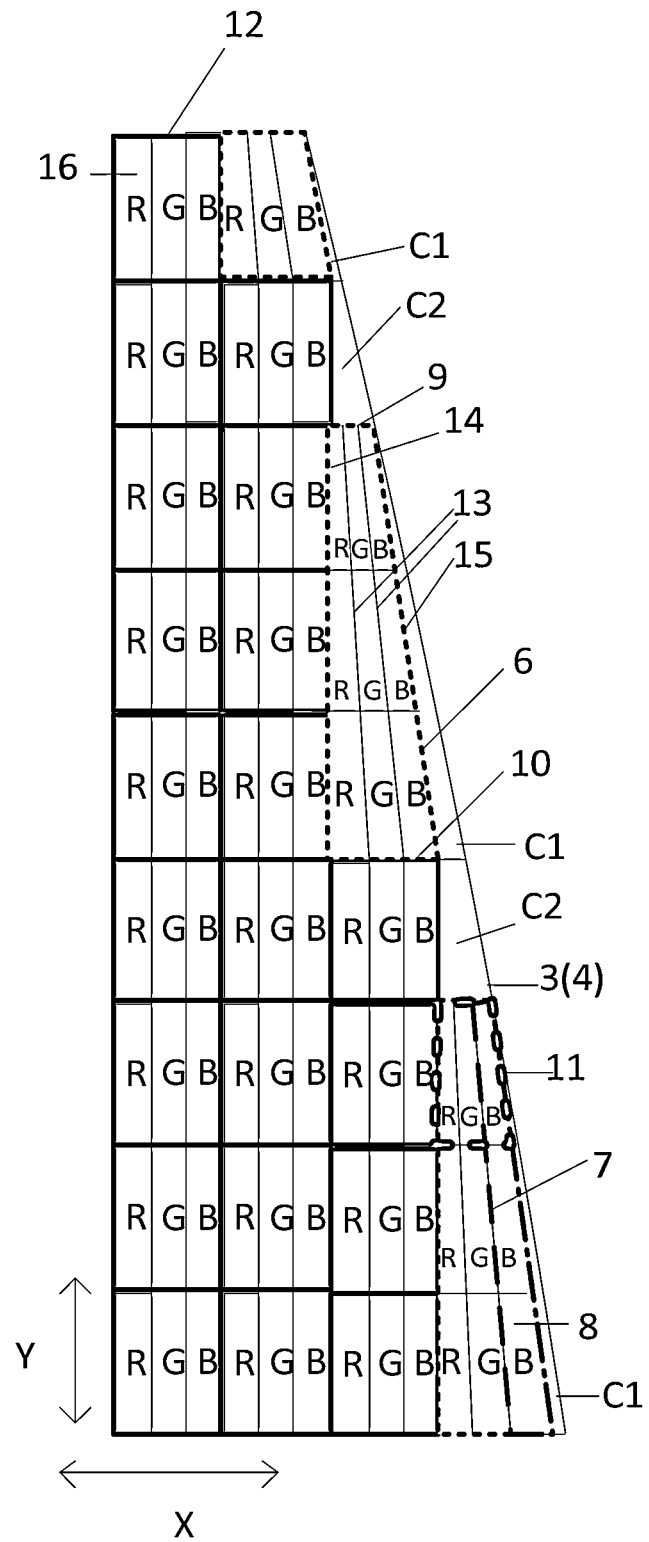
FIG. 3 is another schematic structural of an enlarged view of a region A in FIG. 1 provided by an embodiment of the present disclosure.
Figure 4:
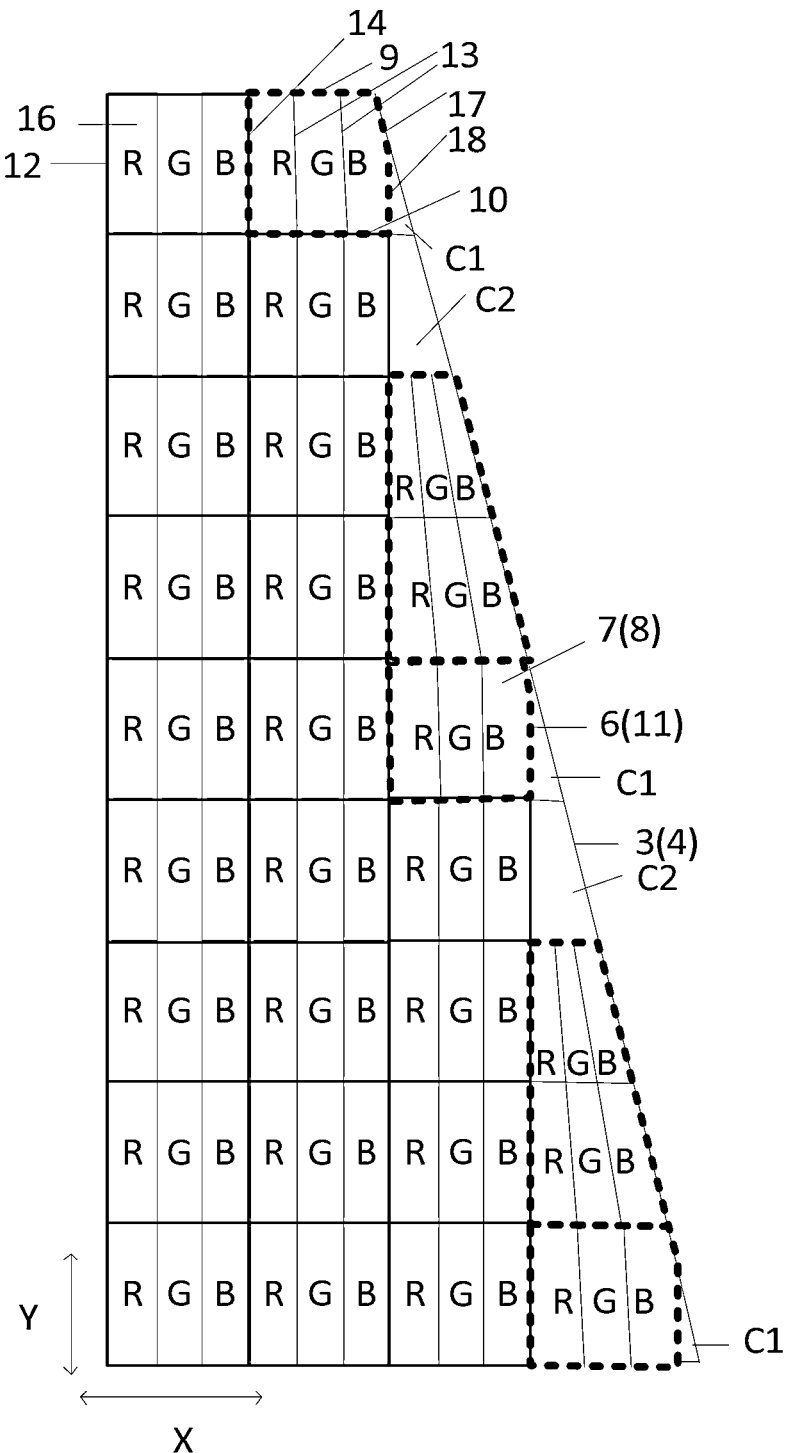
FIG. 4 is yet another schematic structural of an enlarged view of a region A in FIG. 1 provided by an embodiment of the present disclosure.
Figure 5:
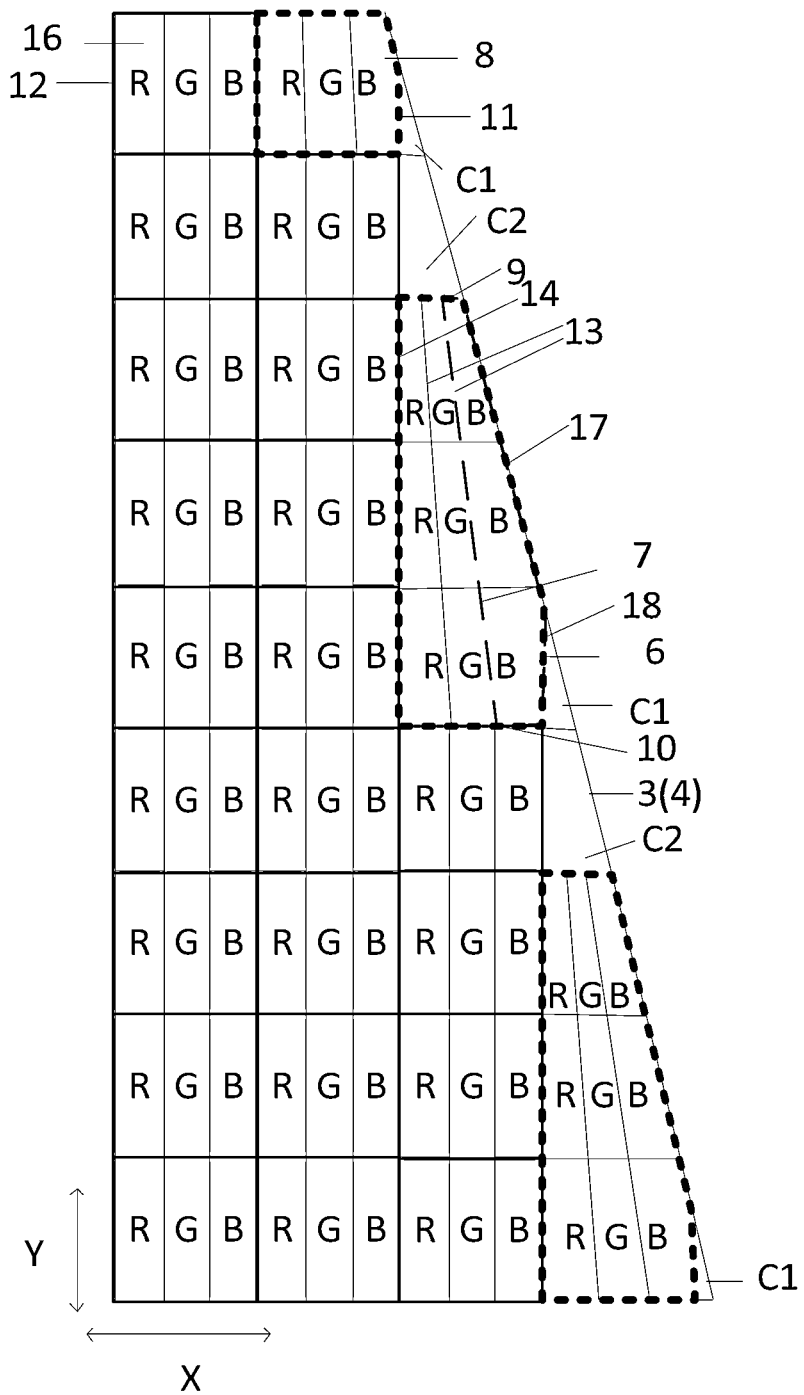
FIG. 5 is yet another schematic structural of an enlarged view of a region A in FIG. 1 provided by an embodiment of the present disclosure.

In some embodiments, as shown in FIG. 2. FIG. 3. FIG. 4 and FIG. 5, the quantity of the first sub-pixel groups 7 included in each first pixel group 6 is equal.

In some embodiments, as shown in FIG. 2. FIG. 3. FIG. 4 and FIG. 5, the plurality of first sub-pixels 8 distributed in the first direction X constitute one first pixel 11.

In some embodiments, as shown in FIG. 2. FIG. 3. FIG. 4 and FIG. 5, the plurality of pixels further include a plurality of second pixels 12, and a shape of each second pixel 12 is a rectangle.

Each second pixel 12 includes a plurality of second sub-pixels 16 distributed in the first direction X; and the quantity of the second sub-pixels 16 included in the second pixel 12 is the same as the quantity of first sub-pixels 8 included in the first pixels 11.

In some embodiments, the pixels except the first pixels are all the second pixels, and at least part of second pixels are located in the display region; and in the first direction, at least part of second pixels are adjacent to the first pixels, and the first pixels are located between the second pixels and a curve part.

During specific implementation, as a shape of each second pixel is a rectangle, and a region between the second pixel at an edge and the curve part is non-rectangular, completely rectangular pixels cannot be arranged in the region. In other words, it may be understood as that a region where the first pixels are arranged is the region between the second pixels and the curve part where the rectangular pixels cannot be arranged completely.

According to the display panel provided by the embodiments of the present disclosure, the shape of the first pixel group adjacent to the curve part is a non-rectangle with the number of sides being greater than 3, so that the shape of the first pixel group may match a shape of the region between the second pixel at the edge and the curve part, and the region nearby the curve part may be prevented from having edge aliasing.

In some embodiments, as shown in FIG. 2. FIG. 3, FIG. 4 and FIG. 5, each first pixel 11 includes three first sub-pixels 8, and each second pixel 12 includes three second sub-pixels 16. Correspondingly, each first pixel group 6 includes three first sub-pixel groups 7. The three first sub-pixels 8 are a red sub-pixel R, a green sub-pixel G and a blue sub-pixel B respectively. The three second sub-pixels 16 are a red sub-pixel R, a green sub-pixel G and a blue sub-pixel B respectively.

In some embodiments, as shown in FIG. 2. FIG. 3, FIG. 4 and FIG. 5, display colors of two adjacent sub-pixels in the first direction X are not the same; and display colors of two adjacent sub-pixels in the second direction Y are the same.

In some embodiments, as shown in FIG. 2 and FIG. 4, at least part of first pixel groups 6 include only one first pixel 11, and the first sub-pixel group 7 includes only one first sub-pixel 8. In this case, the first bottom side 9 and the second bottom side 10 are two bottom sides of the first pixel 11 parallel to the first direction X respectively.

Or, in some embodiments, as shown in FIG. 3 and FIG. 5, at least part of first pixel groups 6 include a plurality of first pixels 11 distributed in the second direction Y; and each first sub-pixel group 7 includes a plurality of first sub-pixels 8 distributed in the second direction Y, the quantity of the first sub-pixels 8 included in the first sub-pixel group 7 is the same as the quantity of first pixels 11 included in the first pixel group 6, and display colors of the plurality of first sub-pixels 8 included in the first sub-pixel group 7 are the same. In this case, the first bottom side 9) is a bottom side of a first pixel 11 distributed in the second direction Y, and the second bottom side 10) is a bottom side of a last first pixel 11 distributed in the second direction Y.

It needs to be noted that during specific implementation, when at least part of first pixel groups include the plurality of first pixels distributed in the second direction Y, the first pixel group may include two first pixels distributed in the second direction Y, or as shown in FIG. 3, the first pixel group may include three first pixels distributed in the second direction Y, and certainly, the first pixel group may also include more first pixels distributed in the second direction Y.

It needs to be noted that in all first pixel groups included in the display panel, each first pixel group includes one first pixel, or each first pixel group includes the plurality of first pixels, or part of first pixel groups include one first pixel, and each of the other first pixel groups include the plurality of first pixels.

In some embodiments, as shown in FIG. 2. FIG. 3, FIG. 4 and FIG. 5, an area of each first pixel group 6 is equal to a sum of the areas of the plurality of first sub-pixel groups 7 included therein, and the plurality of first sub-pixel groups 7 included in the first pixel group 6 are distributed continuously in sequence in the first direction X.

In some embodiments, as shown in FIG. 2. FIG. 3. FIG. 4 and FIG. 5, the first bottom side 9) and the second bottom side 10 are divided in average by the plurality of first sub-pixel groups 7 included in the first pixel group 6, a boundary between any adjacent first sub-pixel groups is a first oblique side 13, and the first oblique side 13 is not perpendicular to both the first bottom side 9 and the second bottom side 10.

During specific implementation, the first bottom side and the second bottom side are divided in average by the plurality of first sub-pixel groups included in the first pixel group, that is, the first bottom side and the second bottom side are divided in average by the plurality of first oblique sides.

According to the display panel provided by the embodiments of the present disclosure, the first bottom side and the second bottom side are divided in average by the plurality of first sub-pixel groups included in the first pixel group, so the areas of the plurality of first sub-pixel groups included in the first pixel group may be approximately equal, thus the region nearby the curve part may be prevented from having Newton's rings, the display effect may be improved, and user experience is improved.

During specific implementation, if the first pixel group includes m first sub-pixel groups, the first pixel group has (m−1) first oblique sides. As shown in FIG. 2. FIG. 3. FIG. 4 and FIG. 5, the first pixel group includes three first sub-pixel groups, so the first pixel group has two first oblique sides. The first bottom side 9 is divided into three parts in average by the two first oblique sides 13, and the second bottom side 10 is divided into three parts by the two first oblique sides 13 in average.

During specific implementation, when the first pixel group includes only one first pixel, the first oblique side is a boundary between two adjacent first sub-pixels in the first pixel.

In some embodiments, as shown in FIG. 2. FIG. 3. FIG. 4 and FIG. 5, the first oblique sides 13, the first bottom side 9 and the second bottom side 10 are all straight-line segments.

In some embodiments, as shown in FIG. 2 and FIG. 3, the shapes of at least part of first pixel groups 6 are quadrilaterals, and the shapes of the plurality of first sub-pixel groups 7 included in the first pixel group 6 are quadrilaterals; and each first pixel group 6 further includes a first right-angle side 14 perpendicular to both the first bottom side 9 and the second bottom side 10, and a second oblique side 15 not perpendicular to both the first bottom side 9 and the second bottom side 10, and the second oblique side 15 is adjacent to the curve part 3.

According to the display panel provided by the embodiments of the present disclosure. when the shape of the first pixel group is a quadrilateral, the shape of the first pixel group may be a right trapezoid or an approximate right trapezoid.

In some embodiments, as shown in FIG. 2 and FIG. 3, the second oblique sides 15 are straight-line segments, and the shape of the first pixel group 6 and the shapes of the plurality of first sub-pixel groups 7 included in the first pixel group 6 are all trapezoids; and the areas of the plurality of first sub-pixel groups 7 included in the first pixel group 6 are equal.

According to the display panel provided by the embodiments of the present disclosure, the shape of the first pixel group is a right trapezoid, it may be known according to a trapezoid calculation formula that the area of the first pixel group is: $(b+c)*h/2$, and when the first bottom side and the second bottom side are divided in average by the plurality of first oblique sides, the areas of the plurality of first sub-pixel groups included in the first pixel group are all equal, and the area of each first sub-pixel group is $((b/3)+(c/3))*h/2$, where b is a length of the first bottom side, c is a length of the second bottom side, and h is a length of the first right-angle side.

It needs to be noted that when the first pixel group includes only one first pixel, the shapes of the first pixel and the first sub-pixels included therein are all trapezoids, and the areas of the plurality of first sub-pixels included in the first pixels are equal.

It needs to be noted that when the first pixel group includes the plurality of first pixels, the shapes of each first pixel and the first sub-pixels included therein are all trapezoids. When two bottom sides of the first pixel are divided in average by the first oblique sides, the areas of the plurality of first sub-pixels included in each first pixel are equal, otherwise, the areas of the plurality of first sub-pixels included in each first pixel are not completely equal. Even though the areas of the plurality of first sub-pixels included in each first pixel are not completely equal, during specific implementation, as lengths of all the pixels in the second direction Y are the same, under the condition that the areas of the plurality of first sub-pixel groups included in the first pixel group are all equal, though the areas of the plurality of first sub-pixels included in each first pixel are not completely equal, and a difference between the areas of the plurality of first sub-pixels is small, the areas of the plurality of first sub-pixels included in the first pixel may still be approximately equal, a difference of viewing by human eyes macroscopically is not caused, and the Newton's rings may be avoided.

Figure 6:
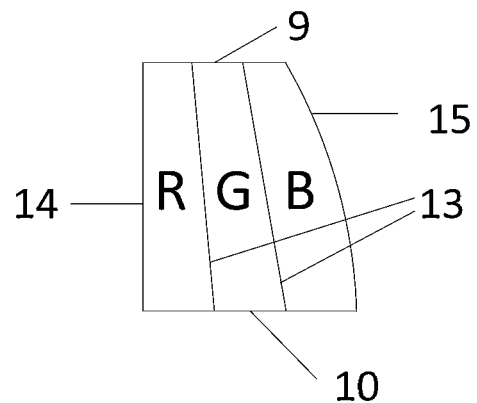
FIG. 6 is a schematic structural diagram of a first pixel group provided by an embodiment of the present disclosure.
Figure 7:
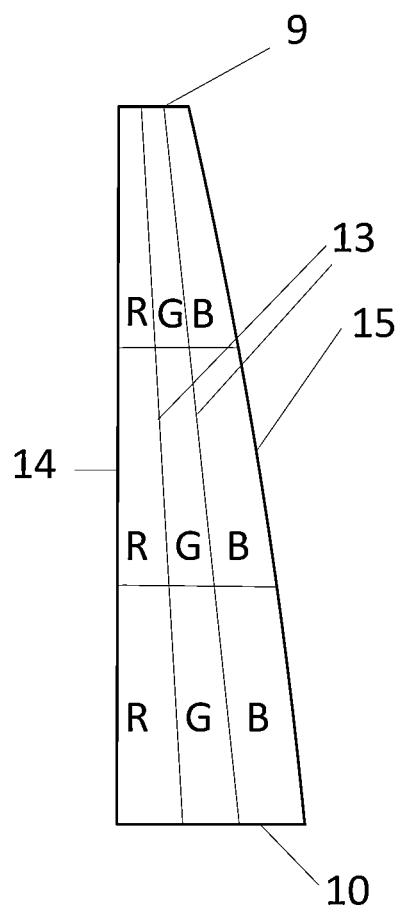
FIG. 7 is a schematic structural diagram of another first pixel group provided by an embodiment of the present disclosure.

Or, in some embodiments, as shown in FIG. 6 and FIG. 7, the second oblique side 15 is an arc segment.

In the first pixel group 6, a shape of the first sub-pixel group 7 closest to the curve part 3 is an approximate trapezoid with the second oblique side 15 being the arc segment, and the shapes of the first sub-pixel groups 7 except that being closest to the curve part 3 are all trapezoids. In FIG. 6 and FIG. 7, a shape of the red sub-pixel and a shape of the green sub-pixel are trapezoids, and a shape of the blue sub-pixel is an approximate trapezoid.

It needs to be noted that when the second oblique side is the arc segment, the first bottom side and the second oblique side are divided in average by the plurality of first oblique sides, the areas of the trapezoid first sub-pixel groups included in the first pixel group are all equal, and the areas of the approximate trapezoid first sub-pixel groups included in the first pixel group are greater than the areas of the trapezoid first sub-pixel groups. However, the first bottom side and the second bottom side are divided in average by the plurality of first oblique sides, a difference between the areas of the approximate trapezoid first sub-pixel groups included in the first pixel group and the areas of the trapezoid first sub-pixel groups is small, so whether the first pixel group includes one first pixel or the plurality of first pixels, it may be realized that the difference between the areas of the approximate trapezoid first sub-pixel included in the first pixel and the areas of the trapezoid first sub-pixels is small, that is, it may still be realized that the areas of the plurality of first sub-pixels included in the first pixel are approximately equal, the difference of viewing by the human eyes macroscopically is not caused, and the Newton's rings may be avoided.

During specific implementation, when the second oblique side is the arc segment, the second oblique side may be close to the curve part as much as possible, so that sub-pixel aperture regions, namely, effective display regions may be closer to the curve part, edge aliasing may be avoided, and the display effect is improved.

During specific implementation, the second oblique side and the curve part may have an overlapping region, so that a region between the second pixel and the curve part may be utilized to the maximum degree, and edge aliasing is further avoided.

FIG. 2 and FIG. 3 makes illustration by taking the shape of the first pixel group being a quadrilateral as an example, and certainly, the shape of the first pixel group may also be a pentagon or other shapes.

In some embodiments, as shown in FIG. 4 and FIG. 5, the shapes of at least part of first pixel groups 6 are pentagons: each first pixel group 6 further includes: a first right-angle side 14 perpendicular to both the first bottom side 9 and the second bottom side 10, a third oblique side 17 connected with the first bottom side 9, and a fourth oblique side 18 connected with the third oblique side 17 and the second bottom side 10; the third oblique side 17 and the fourth oblique side 18 are adjacent to the curve part 3; and in the first pixel group 6, the shape of the first sub-pixel group 7 closest to the curve part 3 is a pentagon, and the shapes of the first sub-pixel groups 7 except that being closest to the curve part 3 are all trapezoids.

According to the display panel provided by the embodiments of the present disclosure, the shapes of at least part of first pixel groups are pentagons, so that in at least part of a region, the shape of the first pixel group may more match the region between the second pixel and the curve part, then the sub-pixel aperture regions, that is, the effective display regions, are closer to the curve part, thus edge aliasing may be further avoided, and the display effect is improved.

According to the display panel provided by the embodiments of the present disclosure, when the shape of the first pixel group is the pentagon, as the first bottom side and the second bottom side are divided in average by the plurality of first oblique sides, the areas of all the trapezoid first sub-pixel groups are equal, and the areas of the pentagon first sub-pixels are greater than the areas of the trapezoid first sub-pixel groups. However, a difference between the areas of the pentagon first sub-pixel groups and the areas of the trapezoid first sub-pixel groups is small, whether the first pixel group includes one first pixel or the plurality of first pixels, it may still be realized that the difference between the areas of the pentagon first sub-pixels included in the first pixel and the areas of the trapezoid first sub-pixels is small, that is, it may still be realized that the areas of the plurality of first sub-pixels included in the first pixels are approximately equal, the difference of viewing by the human eyes macroscopically is not caused, and the Newton's rings may be avoided.

In some embodiments, as shown in FIG. 4 and FIG. 5, both the third oblique side 17 and the fourth oblique side 18 are straight-line segments.

In some embodiments, as shown in FIG. 4 and FIG. 5, the fourth oblique side 18 is perpendicular to the second bottom side 10.

Certainly, in some embodiments, the fourth oblique side may also be not perpendicular to the second bottom side.

Figure 8:
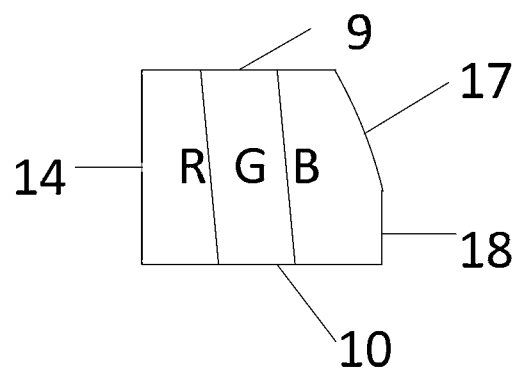
FIG. 8 is a schematic structural diagram of yet another first pixel group provided by an embodiment of the present disclosure.
Figure 9:
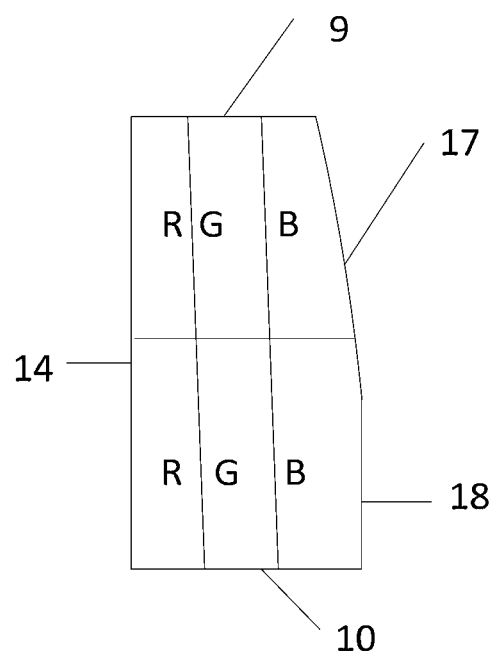
FIG. 9 is a schematic structural diagram of yet another first pixel group provided by an embodiment of the present disclosure.

Or, in some embodiments, as shown in FIG. 8 and FIG. 9, the third oblique side 17 and/or the fourth oblique side 18 are/is arc segments/an arc segment.

It needs to be noted that FIG. 8 and FIG. 9 makes illustration by taking both the third oblique side 17 and the fourth oblique side 18 being the arc segments as an example. During specific implementation, it may be that the third oblique side is the arc segment and the fourth oblique side is the straight-line segment: or it may be that the third oblique side is the straight-line segment and the fourth oblique side is the arc segment.

During specific implementation, when the third oblique side and/or the fourth oblique side are/is the arc segments/the arc segment, the third oblique side and/or the fourth oblique side may be close to the curve part as much as possible, so that the sub-pixel aperture region, namely, the effective display region, may be closer to the curve part, thus edge aliasing may be avoided, and the display effect is improved.

During specific implementation, the third oblique side and/or the fourth oblique side and the curve part may have an overlapping region, so that the region between the second pixel and the curve part may be utilized to the maximum degree, and edge aliasing may be further avoided.

During specific implementation, the shapes of all the first pixel groups included in the display panel are all quadrilaterals: or the shapes of all the first pixel groups included in the display panel are all pentagons: or the shapes of part of first pixel groups included in the display panel are all quadrilaterals, and the shapes of the other first pixel groups are pentagons.

Figure 10:
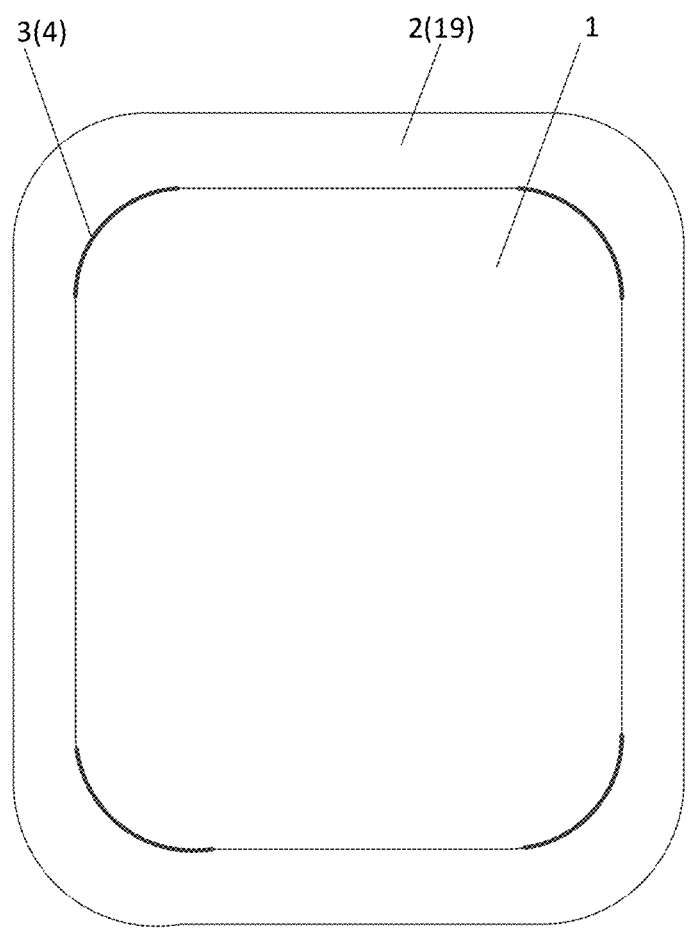
FIG. 10 is a schematic structural diagram of another display panel provided by an embodiment of the present disclosure.

In some embodiments, as shown in FIG. 1 and FIG. 10, the curve part 3 includes a plurality of circular arc parts 4; and a radian of each circular arc part 4 is smaller than or equal to 90°.

In some embodiments, as shown in FIG. 1 and FIG. 10, the at least one non-display region 2 includes: a first non-display region 19 surrounding the display region 1.

In some embodiments, as shown in FIG. 1, a shape of the display region 1 is a circle, and the plurality of circular arc parts 4 included in the curve part 3 are a circumference corresponding to a boundary between the first non-display region 19 and the display region 1. In other words, the curve part 3 includes four circular arc parts 4 with the radian being 90°.

Or, in some embodiments, as shown in FIG. 10, the shape of the display region 1 is a rounded rectangle, and the plurality of circular arc parts 4 are four rounded corner parts of the boundary between the display region 1 and the first non-display region 19.

Figure 11:
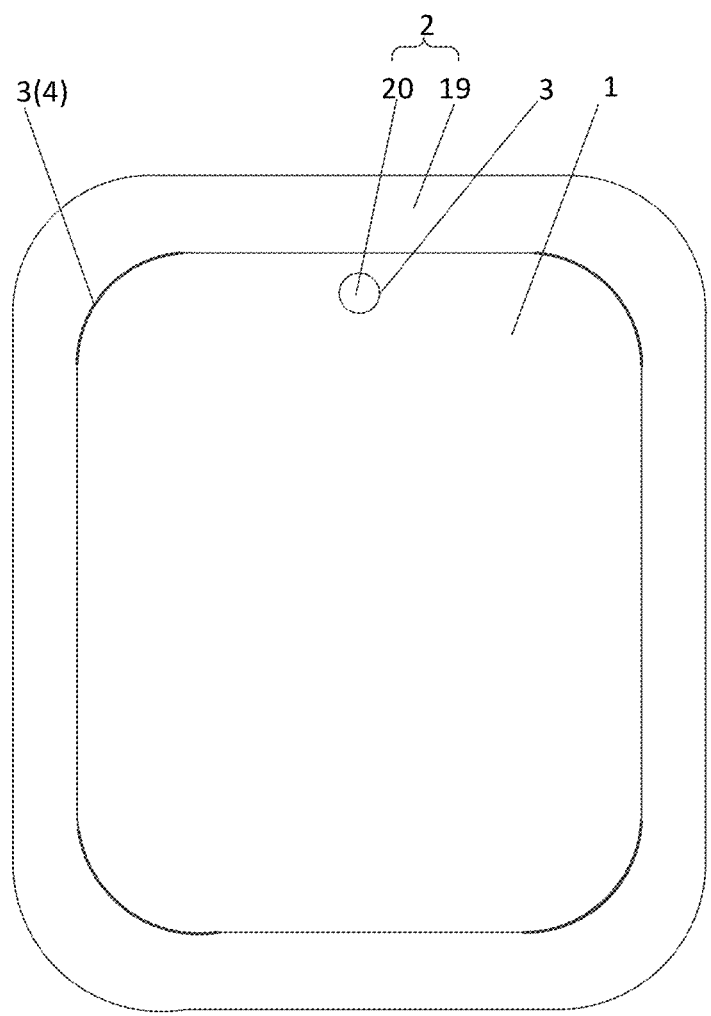
FIG. 11 is a schematic structural diagram of yet another display panel provided by an embodiment of the present disclosure.

Or, in some embodiments, as shown in FIG. 11, the at least one non-display region 2 includes: a second non-display region 20 surrounded by the display region 1.

In some embodiments, as shown in FIG. 11, the curve part 3 is a circumference corresponding to the boundary between the second non-display region 20 and the display region 1.

It needs to be noted that FIG. 11 makes illustration by taking an outline of the display region being the rounded rectangle and the second non-display region being a circle as an example. Certainly, during specific implementation, the outline of the display region may also be a circle, a rectangle or the like, and a shape of the second non-display region may also be other shapes with circular arc parts.

Figure 12:
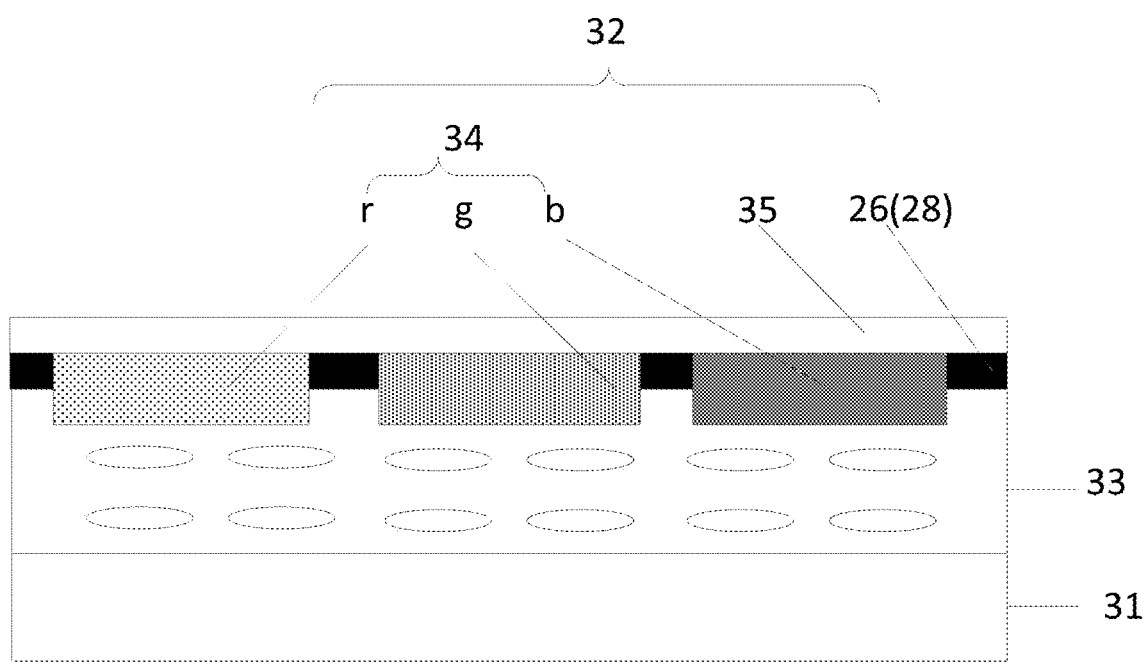
FIG. 12 is a schematic structural diagram of yet another display panel provided by an embodiment of the present disclosure.
Figure 13:
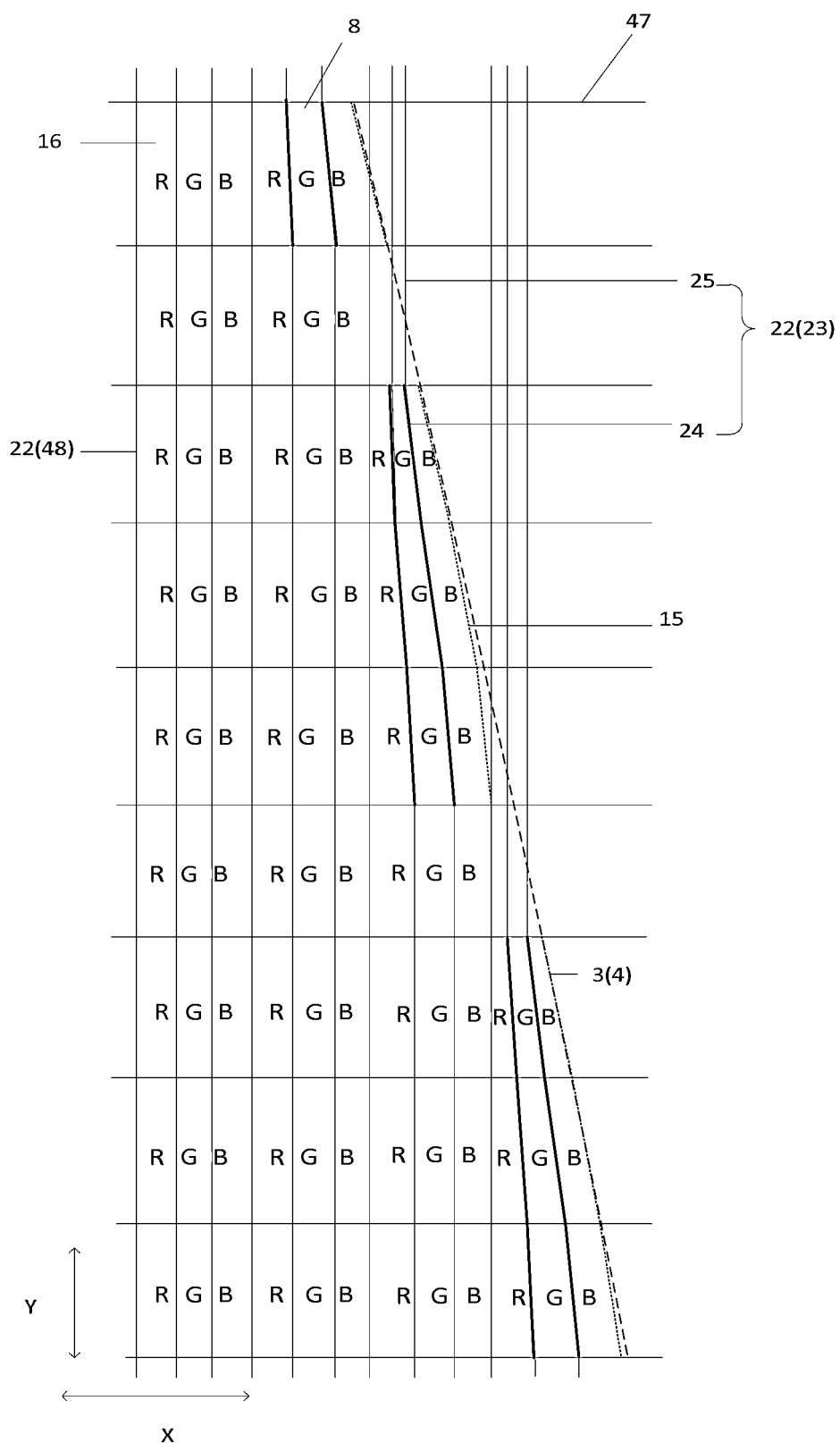
FIG. 13 is a schematic structural diagram of an array substrate provided by an embodiment of the present disclosure.
Figure 14:
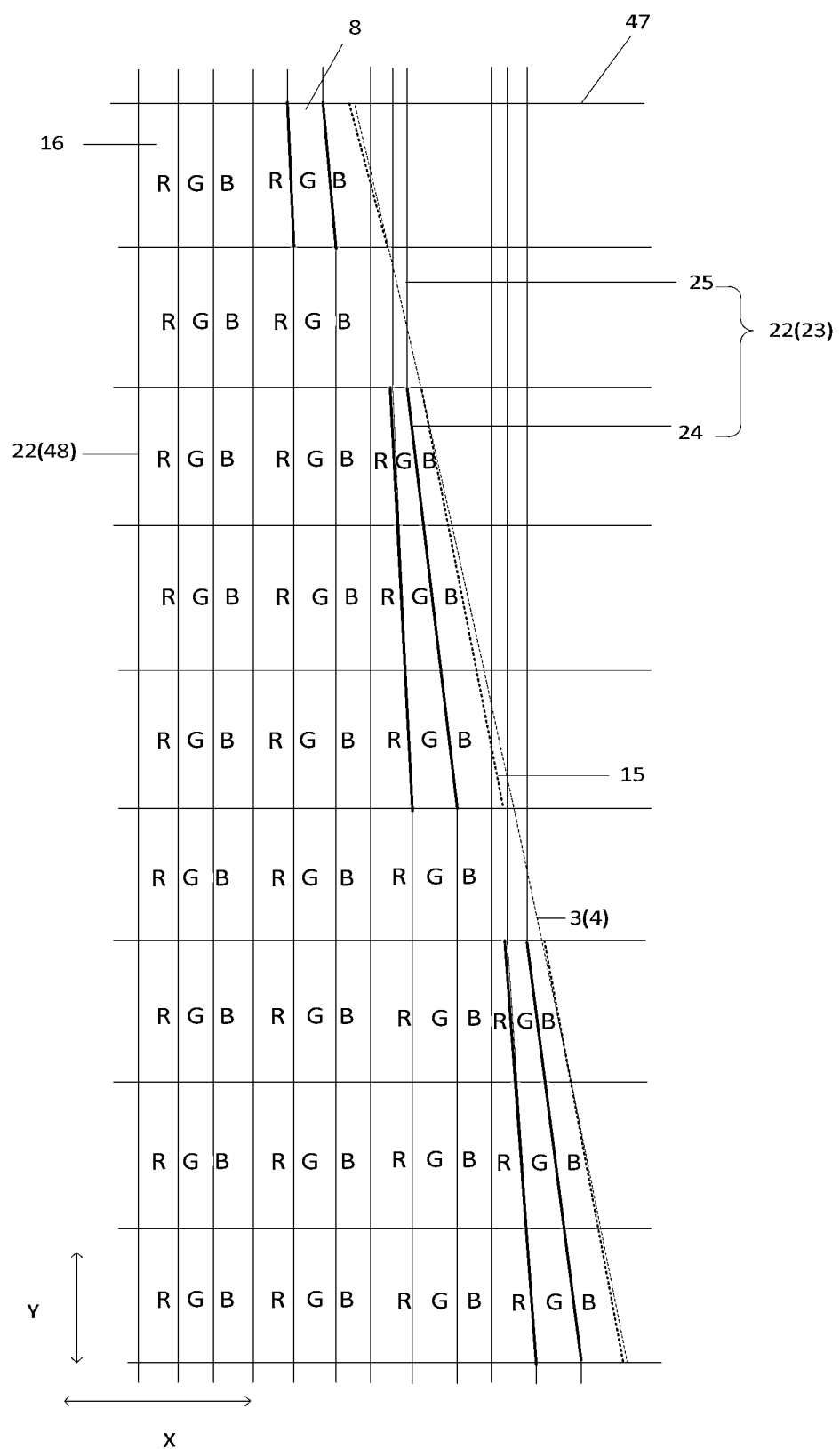
FIG. 14 is a schematic structural diagram of another array substrate provided by an embodiment of the present disclosure.
Figure 15:
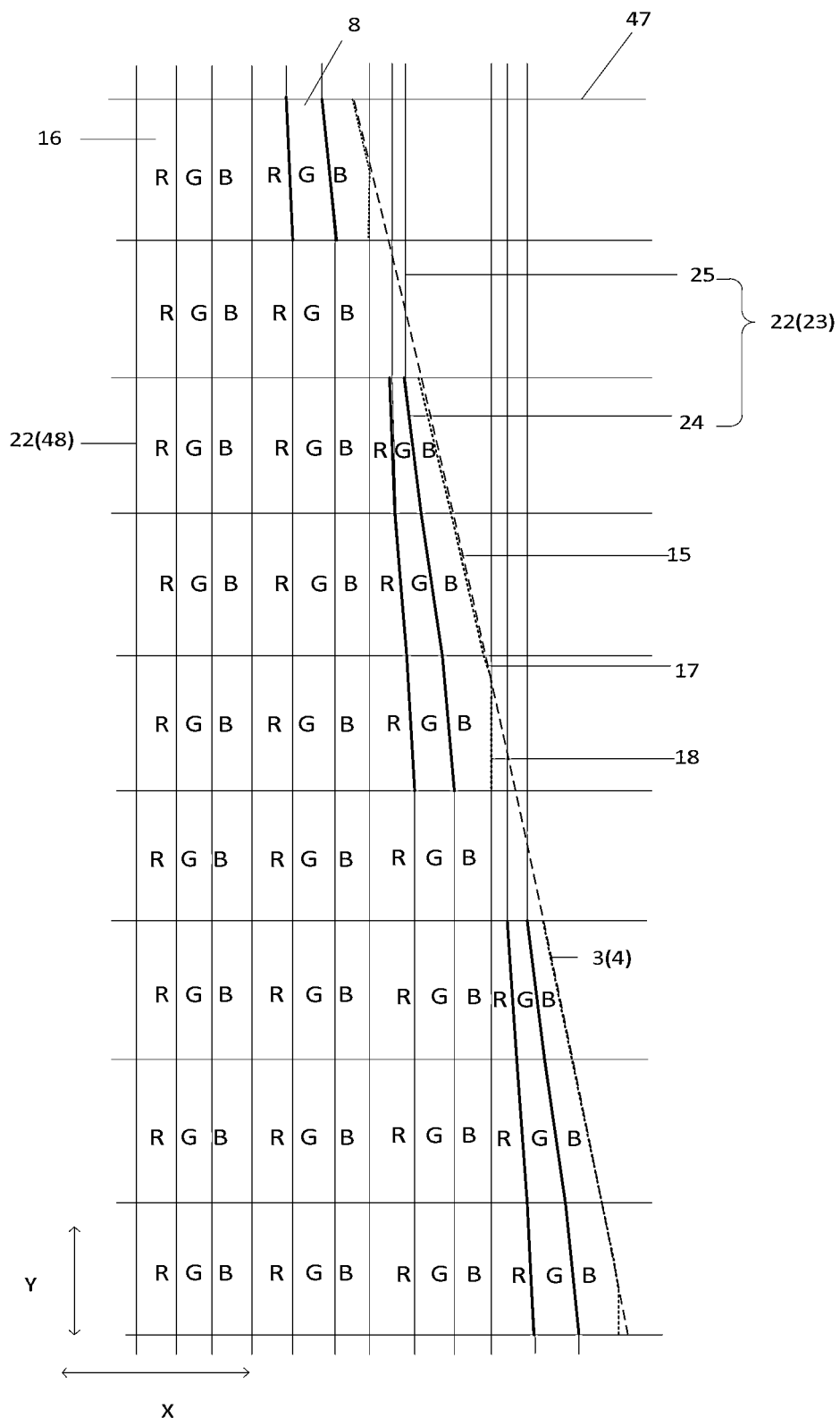
FIG. 15 is a schematic structural diagram of yet another array substrate provided by an embodiment of the present disclosure.
Figure 16:
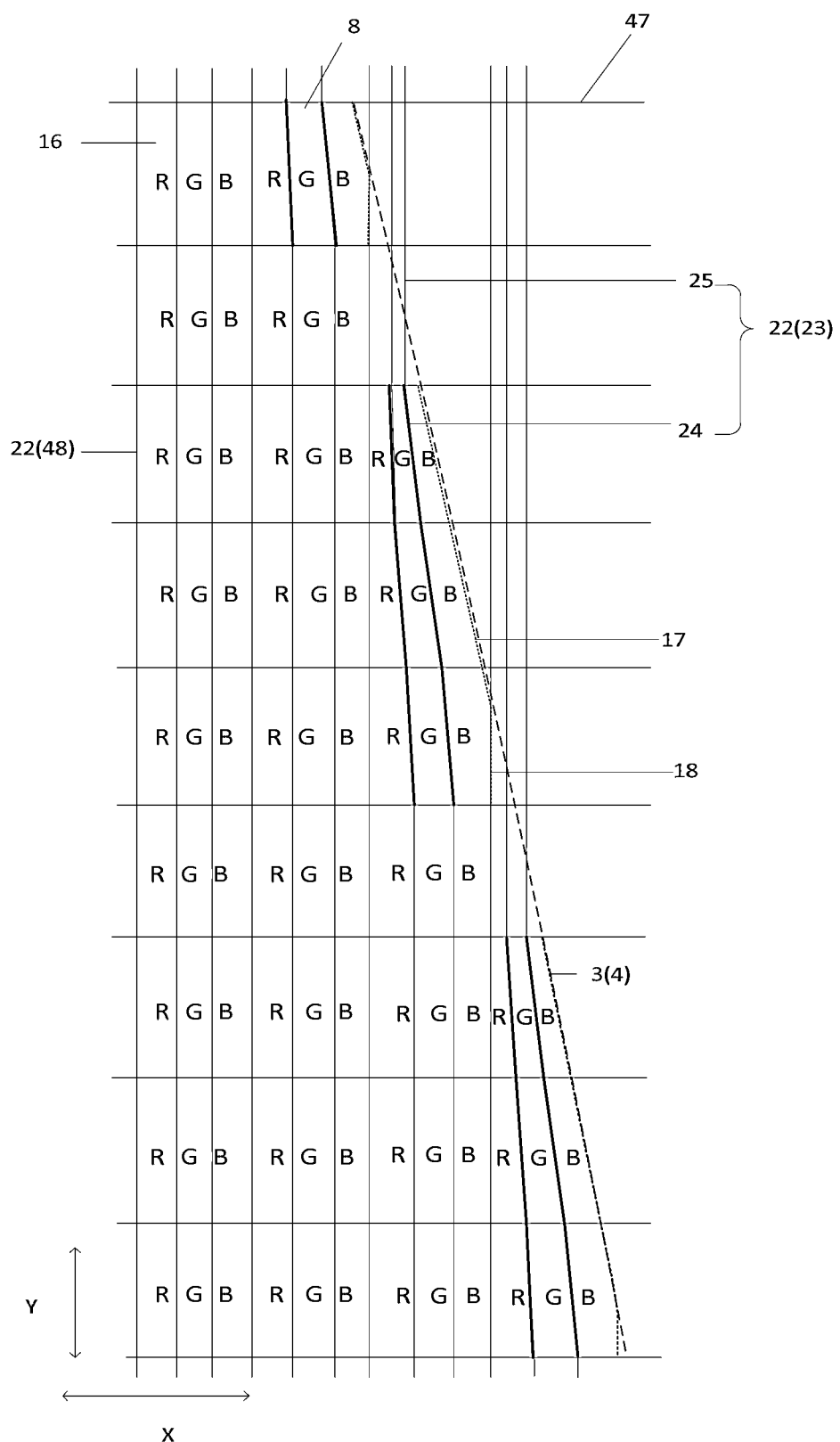
FIG. 16 is a schematic structural diagram of yet another array substrate provided by an embodiment of the present disclosure.
Figure 17:
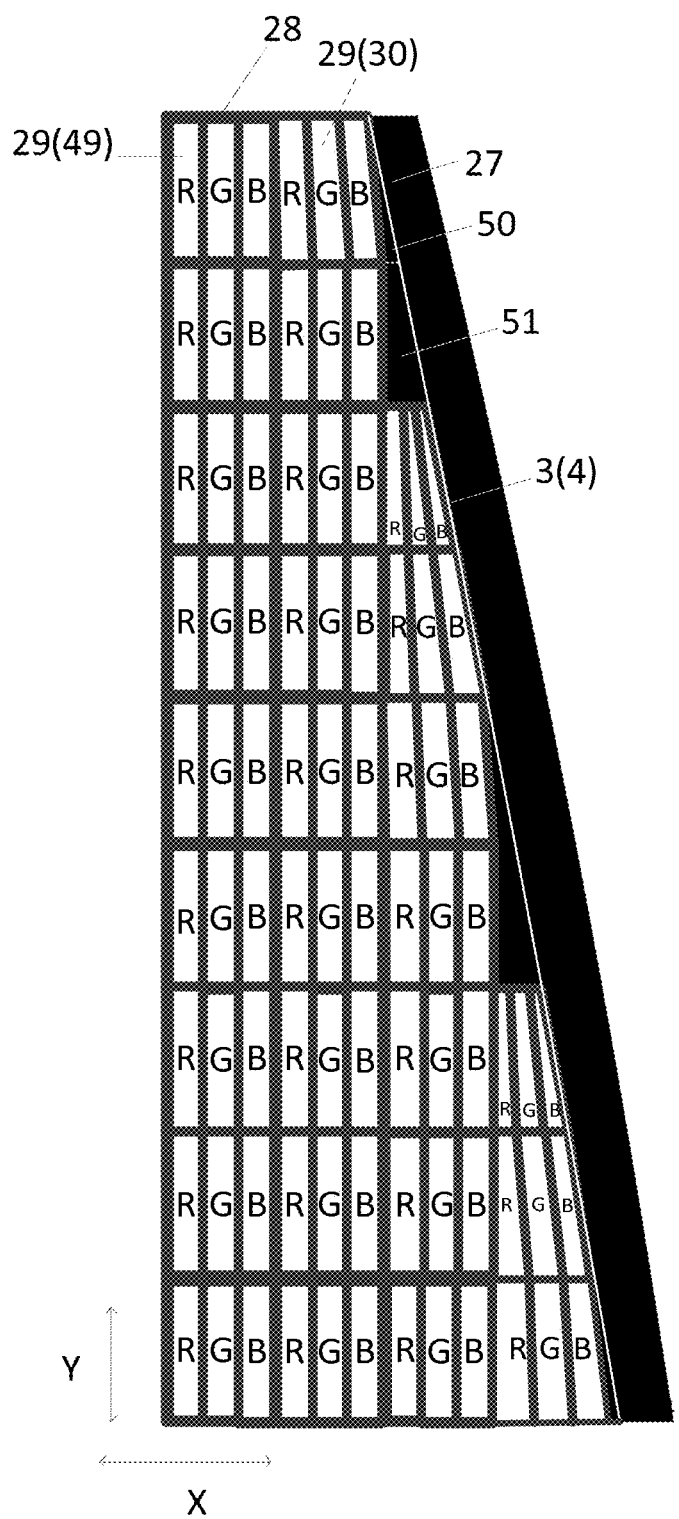
FIG. 17 is a schematic structural diagram of an opposite substrate provided by an embodiment of the present disclosure.

In some embodiments, as shown in FIG. 12, the display panel includes:

an array substrate 31, as shown in FIG. 13 to FIG. 16, including: a first base substrate 36 and a plurality of data lines 22 located on a side of the first base substrate 36 and distributed in the first direction X: the plurality of data lines 22 include a plurality of first data lines 23, and each first data line 23 includes a first bent part 24 corresponding to the first oblique side and a straight-line part 25 connected with the first bent part 24;

an opposite substrate 32, opposite to the array substrate 31 and including: a second base substrate 35 and a light shield layer 26 located on a side of the second base substrate 35 facing the array substrate 31: as shown in FIG. 17, the light shield layer 26 includes: a first light shield part 27, a second light shield part 28 and a plurality of sub-pixel aperture regions 29, an orthographic projection of a region surrounded by the first light shield part 27 on the second base substrate coincides with the display region 1, the second light shield part 28 is located between adjacent sub-pixel aperture regions 29, and the plurality of sub-pixel aperture regions 29 include first aperture regions 30 similar to the first sub-pixels in shape; and a liquid crystal layer 33, located between the array substrate 31 and the opposite substrate 32.

During specific implementation, the first bent part is parallel to the first oblique side, and orthographic projections of the first bent part and the first oblique side coincide.

It needs to be noted that FIG. 13 to FIG. 16 are schematic diagrams of arrangement modes of the data lines corresponding to FIG. 2 to FIG. 5 respectively. During specific implementation, when the first pixel group includes only one first pixel, and the plurality of first pixels are distributed in sequence in the second direction Y, an included angle exists between first oblique sides of the adjacent first pixels in the second direction Y. Therefore, the plurality of adjacent first pixels are distributed in sequence in the second direction Y, the corresponding first data lines have a plurality of first bent parts corresponding to the first oblique sides of the plurality of first pixels, and the plurality of first bent parts are connected in sequence. When the first pixel group includes the plurality of first pixels, the included angle between the first oblique sides of the plurality of first pixels in the first pixel group is zero, correspondingly, in a region corresponding to one first pixel group, each first data line includes only one first bent part, and thus data line design and fabrication difficulty may be reduced.

During specific implementation, as shown in FIG. 13 to FIG. 16, the plurality of data lines 22 further include a plurality of second data lines 48: the second data lines 48 are straight-line segments: the array substrate further includes a plurality of scanning lines 47 distributed in the second direction Y; and the plurality of scanning lines 47 and the plurality of data lines 22 intersect transversely and longitudinally, and the scanning lines 47 and the data lines 22 define a region of the sub-pixels.

In some embodiments, the second light shield part covers the data lines and the scanning lines.

Figure 18:
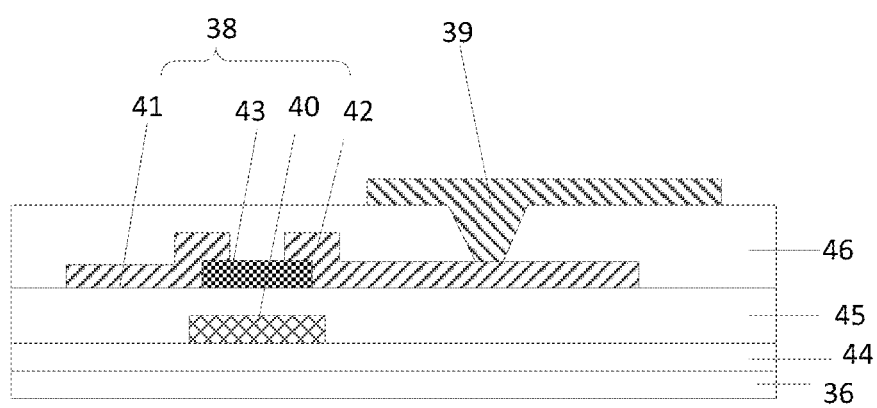
FIG. 18 is a schematic structural diagram of yet another array substrate provided by an embodiment of the present disclosure.

In some embodiments, as shown in FIG. 18, the array substrate further includes: a thin film transistor 38, and a pixel electrode 39 electrically connected with the thin film transistor 38. The thin film transistor 38 includes: a gate 40, a source electrode 41, a drain electrode 42 and an active layer 43. FIG. 18 makes illustration by taking the thin film transistor being of a bottom gate structure as an example, the array substrate 31 further includes: a buffer layer 44 located between the gate 40 and the first base substrate 36, a gate insulation layer 45 located between the gate 40 and the active layer 43, and a passivation layer 46 located between the drain electrode 42 and the pixel electrode 39. During specific implementation, the gate of the thin film transistor is electrically connected with the scanning line, the source electrode of the thin film transistor is electrically connected with the data line, and the drain electrode of the thin film transistor is electrically connected with the pixel electrode. The array substrate or the opposite substrate further includes a common electrode.

In some embodiments, an orthographic projection of a region surrounded by the first light shield part on the second base substrate coincides with the display region.

According to the display panel provided by the embodiments of the present application, the boundary between the display region and the first non-display region is limited through the first light shield part, and a size of the sub-pixel aperture region is limited through the second light shield part. When the boundary between the display region and the first non-display region includes the curve part, that is, a shape surrounded by the first non-display region is a non-rectangle, a process of limiting a range of the display region through the first light shield part is simple and easy to implement.

When the display panel is a liquid crystal display panel, during specific implementation, whether the shape surrounded by the first non-display region is a circle, a rounded rectangle or other non-rectangles, the shape of the region surrounded by the first non-display region may be limited through the first light shield part.

In some embodiments, the light shield layer further includes: a sixth light shield part and a first aperture region surrounded by the sixth light shield part; and orthographic projections of the sixth light shield part and the first aperture region on the first base substrate coincide with the second non-display region. During specific implementation, for example, devices such as a camera need to be arranged in the second non-display region. For example, the devices such as the camera are arranged in the first aperture region.

In some embodiments, as shown in FIG. 17, the plurality of sub-pixel aperture regions 29 further include second aperture regions 49 corresponding to the second sub-pixels.

In some embodiments, as shown in FIG. 12, the opposite substrate 32 further includes: a plurality of color resists 34 located on a side of the second base substrate 36 facing the liquid crystal layer 33; and the color resists 34 are located in the aperture region.

In some embodiments, as shown in FIG. 12, the plurality of color resists 34 include: a red color resist r corresponding to the red sub-pixel, a green color resist g corresponding to the green sub-pixel, and a blue color resist b corresponding to the blue sub-pixel.

In some embodiments, as shown in FIG. 2, the plurality of pixels 5 are divided into a plurality of pixel rows 21 extending in the first direction X and distributed in the second direction Y.

Figure 19:
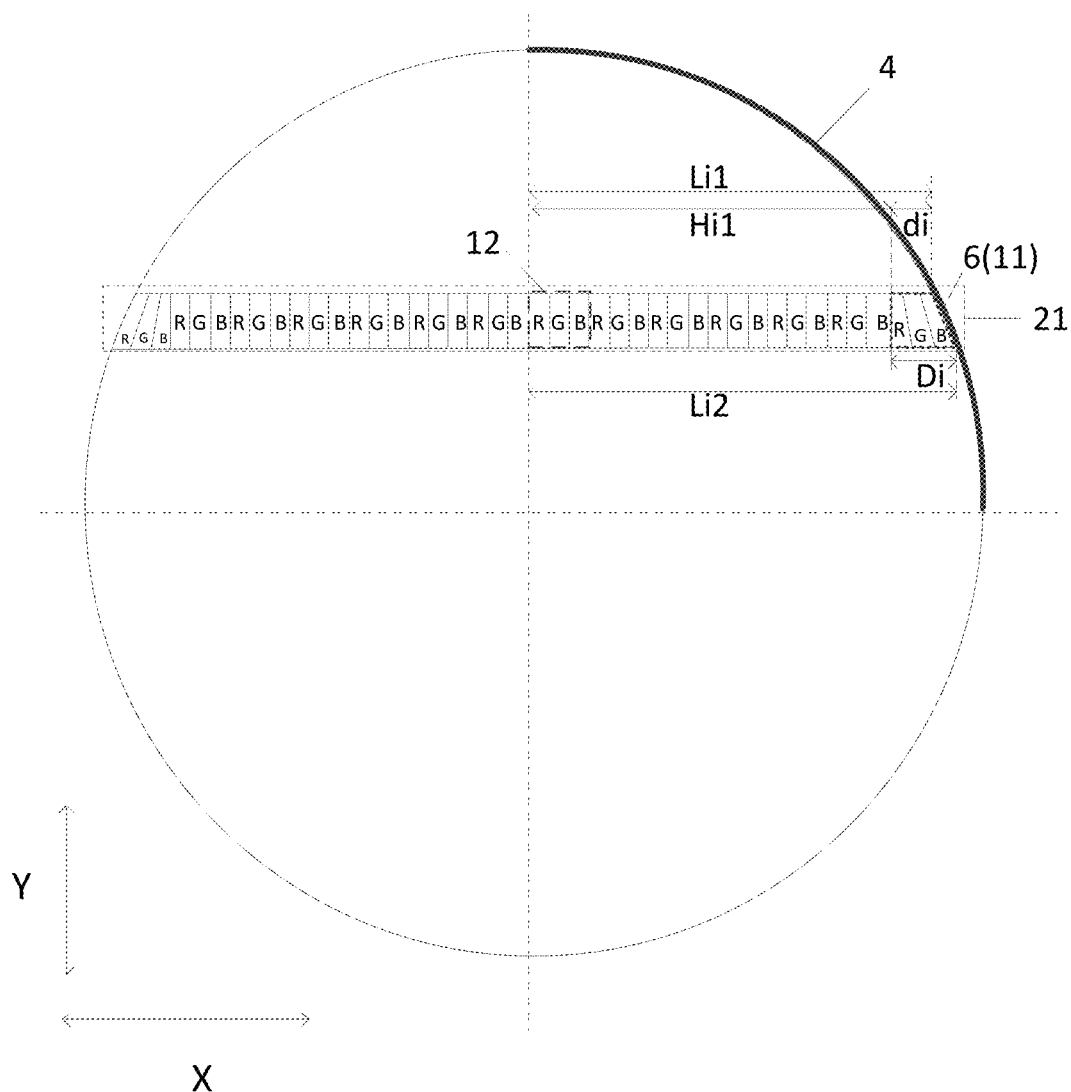
FIG. 19 is a schematic diagram of an arrangement position of first pixels provided by an embodiment of the present disclosure.

In some embodiments, each circular arc part corresponds to n pixel rows, and each pixel row at least includes a plurality of second pixels, where n is an integer greater than 1. As shown in FIG. 19, an $i^{th}$ pixel row in the n pixel rows has a first semifocal chord Li1 and a second semifocal chord Li2 on a circumference corresponding to the circular arc parts 4, where Li2>Li1, and 1≤i≤n.

It needs to be noted that when (Li2-Li1) is far greater than a pixel width, though the pixels are rectangular, when the first light shield part covers part of pixels in the region, circular arcs of the first light shield part uniformly cut the plurality of pixels, a difference between the areas of sub-pixel apertures in each pixel is small, and there is no phenomenon of Newton's rings. When (Li2-Li1) is equal to a width of (m−1) sub-pixels, there is no obvious Newton's rings as well. But when (Li2-Li1) is smaller than the width of (m−1) sub-pixels, if the pixels are rectangular, the first light shield part with the circular arc parts covers part of the rectangular pixels, the difference between the areas of the sub-pixel apertures in each pixel is large, and there is a risk of Newton's rings.

Therefore, during specific implementation, the first pixel group is arranged in a region meeting (Li2-Li1)<(m−1) a/m, where a is a width of the second pixel in the first direction X, m is the quantity of second sub-pixels included in the second pixel 12, and also the quantity of the first sub-pixels included in the first pixel 11.

During specific implementation, pixel rows corresponding to circular arc parts of a region meeting (Li2-Li1)≥(m−1) a/m are all second pixels. In the region meeting (Li2-Li1)≥(m−1) a/m, at least part of second pixels adjacent to the circular arc parts overlap the first light shield part, and shapes of second sub-pixel aperture regions in at least part of second pixels adjacent to the circular arc parts are non-rectangles.

It needs to be noted that sizes of the data lines and the thin film transistor need to be considered, and a total width of the data lines corresponding to the plurality of first sub-pixels and the thin film transistor is not smaller than a/m, so a width of a region where the non-rectangular first pixels are arranged is at least a/m, that is, a/m≤di needs to be met. Besides, in consideration of a limit case, di is a width of a short bottom side of the first pixel, di<a further needs to be met, di is a minimum width between the second pixel closest to the circular arc parts in the $i^{th}$ pixel row and the circular arc parts.

Therefore, in some embodiments, when a/m≤di<a, the $i^{th}$ pixel row further includes the first pixels 11.

In some embodiments, as shown in FIG. 19, m=3, that is, when a/3≤di<a, the $i^{th}$ pixel row further includes the first pixels 11.

It needs to be noted that FIG. 19 makes illustration by taking the shape of the display region being the circle, and the circular arc part being located on the upper right as an example. During specific implementation, in the pixel rows corresponding to the different circular arc parts, an upper and lower position relation between the first semifocal chord Li1 and the second semifocal chord Li2 may differ, but arrangement rules of the first pixels in regions corresponding to all the circular arc parts are the same, which is not repeated here.

During specific implementation, as shown in FIG. 19, di=Li1-Hi1, Hi1 is a total width of the plurality of second pixels 12 corresponding to the first semifocal chord Li1 in the $i^{th}$ pixel row:

Besides, when the circular arc parts are rounded corner parts of the rounded rectangle or are the circumference corresponding to the boundary between the display region and the second non-display region, it also needs to be met like this, the first pixel group is arranged in the region meeting (Li2-Li1)<(m−1) a/m, and when a/m≤di<a, the $i^{th}$ pixel row includes the first pixels.

During specific implementation, when the shape of the display region is the circle or the rounded rectangle, and the $i^{th}$ pixel row corresponding to the circular arc parts further includes the first pixels, the first one pixel and the last pixel in the $i^{th}$ pixel row are the first pixels.

In some embodiments, when di<a, the second pixels in the $i^{th}$ pixel row are adjacent to the circular arc parts.

It needs to be noted that when di<a, complete first pixels cannot be arranged in the region between the second pixels and the circular arc parts. During specific implementation, as shown in FIG. 2 to FIG. 5, a region C2 is a region meeting di<a.

In some embodiments, as shown in FIG. 17, the light shield layer further includes a third light shield part 51 located between the second pixels and the circular arc part 4. During specific implementation, the region C2 is covered with the third light shield part.

It needs to be noted that as a width of a region covered with the third light shield part is smaller than a width of one pixel, edge aliasing is not obvious macroscopically, and the display effect is not affected.

In some embodiments, when a/m≤di<a and a/m≤Di<a, the first bottom side 9 and the second bottom side 10 intersect with the circular arc parts, where Di is a maximum width between the second pixel closest to the circular arc part in the $i^{th}$ pixel row and the circular arc part.

In other words, when a/m≤di<a and a/m≤Di<a, di is a width of the first bottom side, and Di is a width of the second bottom side.

During specific implementation, when the shape of the display region is the circle, and the curve part is the circumference formed by the four circular arc parts, as shown in FIG. 19. Di=Li2-Hi1.

During specific implementation, as shown in FIG. 2, the first bottom side 9 and the second bottom side 10 of the first pixel with the reference numeral 52 intersect with the circular arc part. When the first bottom side and the second bottom side intersects with the circular arc part, the second oblique side may be closer to the curve part, and the second oblique side, when being an arc segment, may also overlap part of a region of the curve part, edge aliasing may be avoided, and the display effect is improved.

In some embodiments, when a/m≤di<a and a≤Di, a distance between the second bottom side and the circular arc part is greater than zero.

In other words, when a/m≤di<a and a≤Di, the width of the second bottom side is smaller than Di. During specific implementation, as shown in FIG. 2 to FIG. 5, the region C1 corresponds to a region where the distance between the second bottom side and the circular arc part is greater than zero.

In some embodiments, as shown in FIG. 17, the light shield layer further includes a fourth light shield part 50 located between the first pixel and the curve part 3. During specific implementation, the region C1 is covered with the fourth light shield part.

The embodiments of the present disclosure provide a display apparatus, including the display panel provided by the embodiments of the present disclosure.

In some embodiments, when the display panel is a liquid crystal display panel, the display apparatus further includes a backlight module, and the display panel is located on a light exit side of the backlight module.

The display apparatus provided by the embodiments of the present disclosure is: a mobile phone, a tablet computer, a television, a display, a notebook computer, a digital photo frame, a navigator and any product or component with a display function. Other necessary components of the display apparatus should be understood by those ordinarily skilled in the art, which is neither described in detail here, nor supposed to serve as a limit on the present disclosure. Implementation of the display apparatus may refer to the embodiment of the above display panel, and repetitions are omitted.

To sum up, according to the display panel and the display apparatus provided by the embodiments of the present disclosures, the shapes of the first pixel groups adjacent to the curve part are non-rectangles with the number of sides being greater than 3, so that the shapes of the first pixel groups may match the shape of the display region nearby the curve part, the region nearby the curve part may be prevented from having edge aliasing, besides, the non-display region may be prevented from blocking the first pixel group, that is, the first sub-pixels in the first pixel groups are prevented from being blocked by the non-display region, and integrity of the first sub-pixels in the first pixel groups is ensured. Correspondingly, when the areas of the plurality of first sub-pixel groups included in the first pixel group are approximately equal, the Newton's rings may be prevented from occurring in the region nearby the curve part, the display effect may be improved, and the user experience is improved.

Though the preferred embodiments of the present disclosure have been already described, those skilled in the art may make extra changes and modifications to these embodiments once they know a basic inventive concept. Therefore, the appended claims intend to be construed as including the preferred embodiments and all changes and modifications falling within the scope of the present disclosure.

Apparently, those skilled in the art may make various changes and variations to the embodiments of the present disclosure without departing from the spirit and the scope of the embodiments of the present disclosure. In this case, if these modifications and variations of the embodiments of the present disclosure fall within the scope of the claims of the present disclosure and their equivalents, the present disclosure also intends to contain these modifications and variations.

What is claimed is:

1. A display panel, comprising:
   a display region and at least one non-display region adjacent to the display region, wherein a boundary between the at least one non-display region and the display region has a curve part; and
   the display panel comprises: a plurality of pixels, distributed in a first direction and a second direction in an array; wherein:
   the first direction intersects with the second direction,
   the plurality of pixels comprise: a plurality of first pixel groups adjacent to the curve part, each first pixel group is divided into a plurality of first sub-pixel groups distributed in the first direction, each first sub-pixel group comprises at least one first sub-pixel, a width of the first sub-pixel in the first direction is smaller than a width of the first sub-pixel in the second direction;
   a shape of the first pixel group and a shape of the first sub-pixel group are each a non-rectangle with the number of sides being greater than 3; and
   the first pixel group comprises a first bottom side and a second bottom side parallel to the first direction and opposite to each other, a length of the first bottom side is smaller than a length of the second bottom side, and areas of the plurality of first sub-pixel groups comprised in the first pixel group are approximately equal;
   wherein a plurality of first sub-pixels distributed in the first direction constitute a first pixel, and at least part of first pixel groups comprise only one first pixel; or, a plurality of first sub-pixels distributed in the first direction constitute one first pixel, and at least part of first pixel groups comprise a plurality of first pixels distributed in the second direction;
   wherein the curve part comprises a plurality of circular arc parts, and a radian of each circular arc part is smaller than or equal to 90°;
   wherein the plurality of pixels further comprise a plurality of second pixels, and shapes of the second pixels are rectangles;
   second pixels comprise a plurality of second sub-pixels distributed in the first direction;
   the quantity of the second sub-pixels comprised in the second pixels is the same as the quantity of the first sub-pixels comprised in the first pixels;
   the plurality of pixels are divided into a plurality of pixel rows extending in the first direction and distributed in the second direction;
   each circular arc part corresponds to n pixel rows, and each pixel row at least comprises a plurality of second pixels, wherein n is an integer greater than 1; an $i^{th}$ pixel row in the n pixel rows has a first semifocal chord $Li1$ and a second semifocal chord $Li2$ on a circumference corresponding to the circular arc part, wherein $Li2 > Li1$, and $1 \leq i \leq n$; and
   the first pixel groups are arranged in a region meeting $(Li2-Li1) < (m-1) a/m$, wherein $a$ is a width of the second pixel in the first direction, and $m$ is the quantity of second sub-pixels comprised in the second pixels.

2. The display panel according to claim 1, wherein an area of the first pixel group is equal to a sum of the areas of the plurality of first sub-pixel groups comprised in the first pixel group, and the plurality of first sub-pixel groups comprised in the first pixel group are distributed continuously in sequence in the first direction; and
   the first bottom side and the second bottom side are divided in average by the plurality of first sub-pixel groups comprised in the first pixel group, a boundary between any two adjacent first sub-pixel groups is a first oblique side, and the first oblique side is not perpendicular to both the first bottom side and the second bottom side.

3. The display panel according to claim 2, wherein shapes of at least part of the plurality of first pixel groups are quadrilaterals, the shapes of the plurality of first sub-pixel groups comprised in the first pixel group are quadrilaterals; and
   the first pixel group further comprises a first right-angle side perpendicular to both the first bottom side and the second bottom side, and a second oblique side not perpendicular to both the first bottom side and the second bottom side, and the second oblique side is adjacent to the curve part.

4. The display panel according to claim 3, wherein the first oblique side, the first bottom side, the second bottom side and the second oblique side are all straight-line segments, and the shape of the first pixel group and the shapes of the plurality of first sub-pixel groups comprised in the first pixel group are all trapezoids; and
   the areas of the plurality of first sub-pixel groups comprised in the first pixel group are all equal.

5. The display panel according to claim 4, wherein the first oblique side, the first bottom side and the second bottom side are all straight-line segments, and the second oblique side is an arc segment; and
   in the first pixel group, a shape of the first sub-pixel group closest to the curve part is an approximate trapezoid with a second oblique side being an arc segment, and shapes of the first sub-pixel groups except that being closest to the curve part are all trapezoids.

6. The display panel according to claim 2, wherein shapes of at least part of first pixel groups are pentagons;
   the first pixel group further comprises: a first right-angle side perpendicular to both the first bottom side and the second bottom side, a third oblique side connected with the first bottom side and a fourth oblique side connected with the third oblique side and the second bottom side, and the third oblique side and the fourth oblique side are adjacent to the curve part; and in the first pixel group, a shape of the first sub-pixel group closest to the curve part is a pentagon, and shapes of the first sub-pixel groups except that being closest to the curve part are all trapezoids.

7. The display panel according to claim 6, wherein both the third oblique side and the fourth oblique side are straight-line segments; and,
wherein the fourth oblique side is perpendicular to the second bottom side.

8. The display panel according to claim 6, wherein the third oblique side and/or the fourth oblique side is an arc segment.

9. The display panel according to claim 1, wherein a quantity of the first sub-pixel groups comprised in each first pixel group is equal; and,
wherein a shape of an aperture region of the first sub-pixel is similar to a shape of the first sub-pixel.

10. The display panel according to claim 1, wherein when $a/m \le di < a$, the $i^{th}$ pixel row further comprises first pixels, wherein di is a minimum width between a second pixel closest to the circular arc part in the $i^{th}$ pixel row and the circular arc part;
wherein when $di < a$, the second pixels in the $i^{th}$ pixel row are adjacent to the circular arc part.

11. The display panel according to claim 10, wherein when $a/m \le Di < a$, the first bottom side and the second bottom side intersect with the circular arc part, where Di is a maximum width between a second pixel closest to the circular arc part in the $i^{th}$ pixel row and the circular arc part; and
wherein when $a \le Di$, a distance between the second bottom side and the circular arc part is greater than zero, where Di is a maximum width between a second pixel closest to the circular arc part in the $i^{th}$ pixel row and the circular arc part.

12. The display panel according to claim 1, wherein a shape of the display region is a circle; and
the at least one non-display region comprises: a first non-display region surrounding the display region; and the plurality of circular arc parts comprised in the curve part are a circumference corresponding to a boundary between the first non-display region and the display region.

13. The display panel according to claim 1, wherein the at least one non-display region comprises: a first non-display region surrounding the display region; and a shape of the display region is a rounded rectangle, and the plurality of circular arc parts are four rounded corner parts of a boundary between the display region and the first non-display region.

14. The display panel according to claim 1, wherein the at least one non-display region comprises: a second non-display region surrounded by the display region; and a shape of the second non-display region is a circle, and the curve part comprises a circumference corresponding to a boundary between the second non-display region and the display region.

15. The display panel according to claim 2, comprising:
an array substrate, comprising: a first base substrate and a plurality of data lines arranged on a side of the first base substrate and distributed in the first direction, wherein the plurality of data lines comprise a plurality of first data lines, and each first data line comprises a first bent part corresponding to the first oblique side and a straight-line part connected with the first bent part;
an opposite substrate, opposite to the array substrate and comprising: a second base substrate and a light shield layer arranged on a side of the second base substrate facing the array substrate, wherein the light shield layer comprises: a first light shield part, a second light shield part and a plurality of sub-pixel aperture regions, an orthographic projection of a region surrounded by the first light shield part on the second base substrate coincides with the display region, the second light shield part is arranged between adjacent sub-pixel aperture regions, and the plurality of sub-pixel aperture regions comprise first aperture regions similar to the first sub-pixels in shape; and
a liquid crystal layer, arranged between the array substrate and the opposite substrate.

16. The display panel according to claim 15, wherein the plurality of pixels comprise second pixels, and the light shield layer further comprises a third light shield part located between the second pixel and the circular arc part; and
wherein the light shield layer further comprises a fourth light shield part arranged between the first pixels and the circular arc part.

17. A display apparatus, comprising the display panel according to claim 1.

* * * * *